Jan. 9, 1968  A. QUENOT  3,362,075
DEVICE FOR FASTENING A HOOK AT THE EXTREMITY
OF A MEASURING TAPE
Filed April 25, 1966

United States Patent Office 3,362,075
Patented Jan. 9, 1968

3,362,075
DEVICE FOR FASTENING A HOOK AT THE EXTREMITY OF A MEASURING TAPE
André Quenot, Zone Industrielle, "Les Tilleroyes," Besançon, Doubs, France
Filed Apr. 25, 1966, Ser. No. 544,974
Claims priority, application France, Nov. 21, 1964, 995,882
1 Claim. (Cl. 33—137)

This application is a continuation-in-part of my previous application Ser. No. 441,534, now abandoned, filed Mar. 22, 1965.

This invention relates to an improved assembly for fastening a hook at the free end of a measuring tape.

The assembly of the present invention is intended for flexible tape measures designed for measuring both internal and external dimensions. The hook in such constructions is required to slide longitudinally in relation to the tape to an extent corresponding to its thickness. In this manner compensation is made for the thickness of the hook so that either its outer or its inner face may be brought flush with the extremity of the tape according to whether the measurement is to be taken by abutment or by engaging the edge of the surface to be measured.

The object of the present invention is to improve and simplify the construction of flexible measuring tapes having an adjustable hook for the purpose above indicated.

To this effect, the invention provides a linear measuring device having a flexible tape with a notch, and a longitudinal opening spaced therefrom; a hook element consisting of a plate member and a turned down edge member substantially at right angles thereto having a thickness substantially equal to the depth of the notch, the plate having lugs of a somewhat greater height than the tape thickness and surrounded by a boss whose length is less than the length of the longitudinal opening, the difference in these lengths being substantially equal to the thickness of the edge member; the width of said boss being slightly less than the width of said opening so as to permit the boss to fit therein and act as a tape guide and a retainer member larger than the opening fitting thereover and the tape, which member is riveted to the boss so as to permit a sliding arrangement with the plate surface on which is disposed the boss. In a variant of the invention, the plate member is provided with 2 lugs each having an independent boss, the distance separating the outer edges of each boss from those of the other being less than the length of the tape opening in which they fit by an amount equal to the thickness of the edge member.

Figure 1:
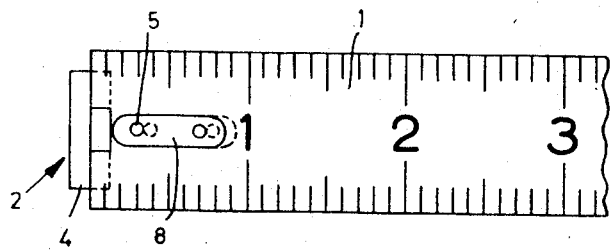
Figure 2:
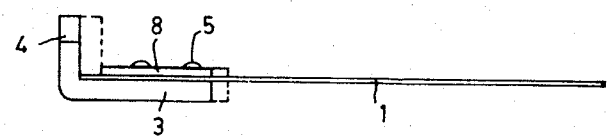
Figure 4:
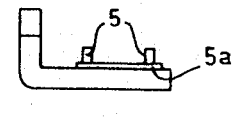
Figure 3:
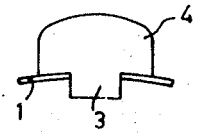
Figure 6:
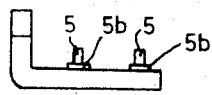
Figure 5:
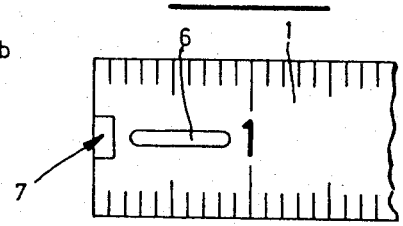

Other features of the present invention will be more particularly pointed out in the specification and in the accompanying drawings, in which:

FIGS. 1, 2 and 3 are a plan view, an elevation, and an elevation and a front view, respectively, of the device according to the invention, FIG. 4 is a perspective view of the hook member of the invention, FIG. 5 a plan view showing the tape to which the hook is secured according to the invention, FIG. 6 a variant of FIG. 4 showing the embodiment of the invention wherein the hook member has lugs provided with independent bosses.

In the drawing, numerals 1 and 2, respectively, designate a flexible metallic measuring tape and a sliding hook fastened to said tape. That hook is constituted by a plate 3, suitably of metal, the extremity of which, preferably broader (FIG. 3), is folded at a right angle in order to form an edge 4. On said plate are formed two lugs 5 (FIG. 4) manufactured in one piece with the hook, by moulding or injection, and also a longitudinal boss encircling these lugs.

The tape is provided with an elongated opening 6 (FIG. 5), sufficiently wider than the boss so as to permit the boss to fit therein; the length of opening 6 being equal to the sum of the length of boss 5a and of the thickness of edge 4. At the extremity of said tape is provided a notch 7 of a depth substantially equal to the thickness of edge 4 and of a width slightly greater than that of plate 3 of hook 2. On lugs 5 of the hook is mounted metal or plastic element 8 larger than and introduced over, opening 6 and to which the lug heads are riveted in conventional fashion such as by upsetting as shown by their rounded heads in FIG. 2.

Boss 5a has two advantages. On the one hand, it facilitates the riveting of lugs 5 to element 8 by preventing too high a pressure to be applied to the tape (which would prevent the hook from sliding) and, on the other hand, it prevents lugs 5 from being urged by the extremities of the tape opening, which, in the long-run, might impair the resistance thereof. The boss may be thicker than the tape or of a dimension such as to act as a spacer to allow the retainer member 8 to function as a slide arrangement jointly with the surface on which the boss is disposed.

In the drawn position, the hook occupies the location indicated in full line in FIG. 1. The inner face of edge 4 is aligned with the outer cross ridge of the tape, where the graduation originates. The outer measurements can thus be taken by hooking edge 4 to a ridge of an unevenness forming the origin of a surface to be measured. As shown in dotted line, the hook can be retracted in order that the outer face of edge 4 be aligned with said ridge of the tape. Inner measurements can be taken by pressing the outer face of the hook against a surface forming the origin of a distance to be measured.

In FIG. 6, the hook as shown is provided with lugs, each of which is encircled by an independent boss 5b. This form of embodiment has the same advantages as the previous one, but, in addition, it is lighter and less expensive. Here again the distance from the end of one boss to the other is less than the length of opening 6 by an amount equal to the thickness of member 4.

Of course, changes can be made without departing from the scope of the present invention. The longitudinal opening 6 can be replaced by two shorter openings, equal in length to that of opening 6, and the hook can be of a slightly different shape.

The claimed assembly can be very simply and economically mounted, since it comprises only one piece, riveted to the tape, to which an additional friction element can be added. Moreover, it offers the advantage of allowing to use hooks that are shorter than in the forms of embodiment known to this day, since the lugs can be fairly near each other, without impairing the accuracy of guiding of the hook.

The provision of boss or bosses disclosed herein is very important in that when riveting is effected no pressure is put on the tape, and the impact of the operation is borne instead by the boss. Again the boss by permitting a substantial lengthwise contact between it and the tape eliminates lateral tensions which can cause ripping of the tape. As a result, it has been noted that much fewer rejects occur during assembly than was formerly the case with other sliding hook assemblies.

What is claimed is:
1. In a linear measuring instrument:
   (A) a hook having a plate with an upstanding part of a given thickness, said part having an inner and an outer face,

(B) a tape of a given thickness having: an end, measuring graduations originating at said end, a notch at said end for receiving said upstanding part of said hook, and an elongated opening of a given length spaced from said notch, (C) lugs each having a head, said lugs having a height greater than said thickness of said tape, a boss adapted to fit in said opening in said tape and surrounding said lugs, said boss having a length smaller than said given length of said opening by an amount equal to said thickness of said upstanding part, (D) a retainer member fitting over said tape and over all of said opening, said member being secured to said heads of said lugs whereby said hook and said member are slidable between an extended position in which said inner face of said upstanding part of the hook is aligned with said end of said tape where said graduations originate and a retracted position wherein said part is received in said notch of said tape.

References Cited

UNITED STATES PATENTS

| | | | |
|---|---|---|---|
| 2,038,099 | 4/1936 | Coe | 33—138 |
| 3,093,876 | 6/1963 | Morin | 24—205.14 |
| 3,131,480 | 5/1964 | Quenot | 33—137 |
| 3,164,907 | 1/1965 | Quenot | 33—138 |

FOREIGN PATENTS 402,200   11/1933   Great Britain.

LEONARD FORMAN, *Primary Examiner.*

J. M. FREED, *Assistant Examiner.*